United States Patent
Soini et al.

(10) Patent No.: US 10,147,096 B2
(45) Date of Patent: Dec. 4, 2018

(54) DEVICE DIAGNOSTIC AND DATA RETRIEVAL

(71) Applicant: T-Mobile USA, Inc., Bellevue, WA (US)

(72) Inventors: Jonathan Michael Soini, Seattle, WA (US); Calum Jonathan Frances Lawler, Samammish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 113 days.

(21) Appl. No.: 14/884,335

(22) Filed: Oct. 15, 2015

(65) Prior Publication Data

US 2016/0269895 A1 Sep. 15, 2016

Related U.S. Application Data

(60) Provisional application No. 62/133,148, filed on Mar. 13, 2015.

(51) Int. Cl.
*G06Q 30/00* (2012.01)
*G06F 3/0484* (2013.01)
*G06F 3/0482* (2013.01)
*G06F 3/0488* (2013.01)
*H04W 24/04* (2009.01)

(52) U.S. Cl.
CPC ......... *G06Q 30/016* (2013.01); *G06F 3/0482* (2013.01); *G06F 3/0488* (2013.01); *G06F 3/04842* (2013.01); *G06F 3/04847* (2013.01); *H04W 24/04* (2013.01)

(58) Field of Classification Search
CPC .. G06Q 10/20; G06Q 30/016; G06F 11/0793; G06F 3/0482; G06F 3/04842; G06F 3/04847; G06F 3/0488; H04W 24/00; H04W 24/04; H04W 4/003
See application file for complete search history.

(56) References Cited

U.S. PATENT DOCUMENTS

| | | | |
|---|---|---|---|
| 8,204,794 B1 * | 6/2012 | Peng | G06Q 10/08 705/26.1 |
| 2003/0167354 A1 * | 9/2003 | Peppers | G06F 8/60 719/327 |
| 2014/0024348 A1 * | 1/2014 | Hurst | H04M 3/5232 455/414.1 |

(Continued)

*Primary Examiner* — Charles Appiah
*Assistant Examiner* — Margaret G Mastrodonato
(74) *Attorney, Agent, or Firm* — Han Santos, PLLC

(57) ABSTRACT

A diagnostic device may enable the retrieval of user device information and an eligibility status of a user device for a device return, a device upgrade, or a device exchange. The diagnostic device may receive the user device information of the user device via a wired or wireless communication interface. The diagnostic device may send the user device information to a server associated with a wireless carrier network. In turn, the server associated with the wireless carrier network may use the user device information to determine an eligibility status of the user device for a device return, a device exchange, or a device upgrade. Subsequently, the diagnostic device may receive a unique code generated by the wireless carrier network, in which the unique code is associated with the user device information of the user device. The diagnostic device then presents the unique code on a display of the diagnostic device.

22 Claims, 6 Drawing Sheets

(56) References Cited

U.S. PATENT DOCUMENTS

| | | | |
|---|---|---|---|
| 2014/0273921 A1* | 9/2014 | Li | H04W 12/06 455/405 |
| 2015/0235270 A1* | 8/2015 | Partida | G06Q 30/0267 705/14.64 |
| 2016/0132840 A1* | 5/2016 | Bowles | G06Q 30/0278 705/306 |

* cited by examiner

DEVICE DIAGNOSTIC AND DATA RETRIEVAL

CROSS REFERENCE TO RELATED PATENT APPLICATION

This patent application claims priority from U.S. Provisional Application No. 62/133,148, filed Mar. 13, 2015, which application is hereby incorporated in its entirety by reference.

BACKGROUND

A wireless telecommunication carrier may operate brick-and-mortar retail locations to serve their customers. At such retail locations, customers may purchase new mobile devices, receive technical support for their existing mobile devices, return or exchange their mobile devices, or upgrade their existing mobile communication devices to newer devices with more advanced features. Customer service representatives of the wireless telecommunication carrier working at these brick-and-mortar retail locations are tasked with assisting the customers with such transactions.

For example, a customer service representative may verify the identity of the customer, ensure that the mobile device being returned, exchanged, or upgraded is eligible to receive such service, and provide other assistance to the customer. The verification of a mobile device for return, exchange, or upgrade often involves a customer service representative manually entering a mobile device identifier into a store computer system to retrieve an eligibility status of the mobile device. However, since mobile device identifiers are often composed of long strings of alphanumeric characters, such manual entry of a mobile device identifier may be time consuming and error prone. Accordingly, a customer service representative may have to make repeated attempts until the mobile device identifier is properly inputted into the store computer system.

Further, in some instances, mobile devices may not have mobile device identifiers readily printed or etched on their casings. In such instances, a customer service representative may have to locate the appropriate mobile device user interface menus of the mobile devices in order to retrieve the mobile device identifiers. Given the variability in mobile device models and software configurations, the unfamiliarity of the customer service representative with different mobile device identifier retrieval procedures may further hinder the ability of the customer service representative to input mobile device identifiers into the store computer system.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
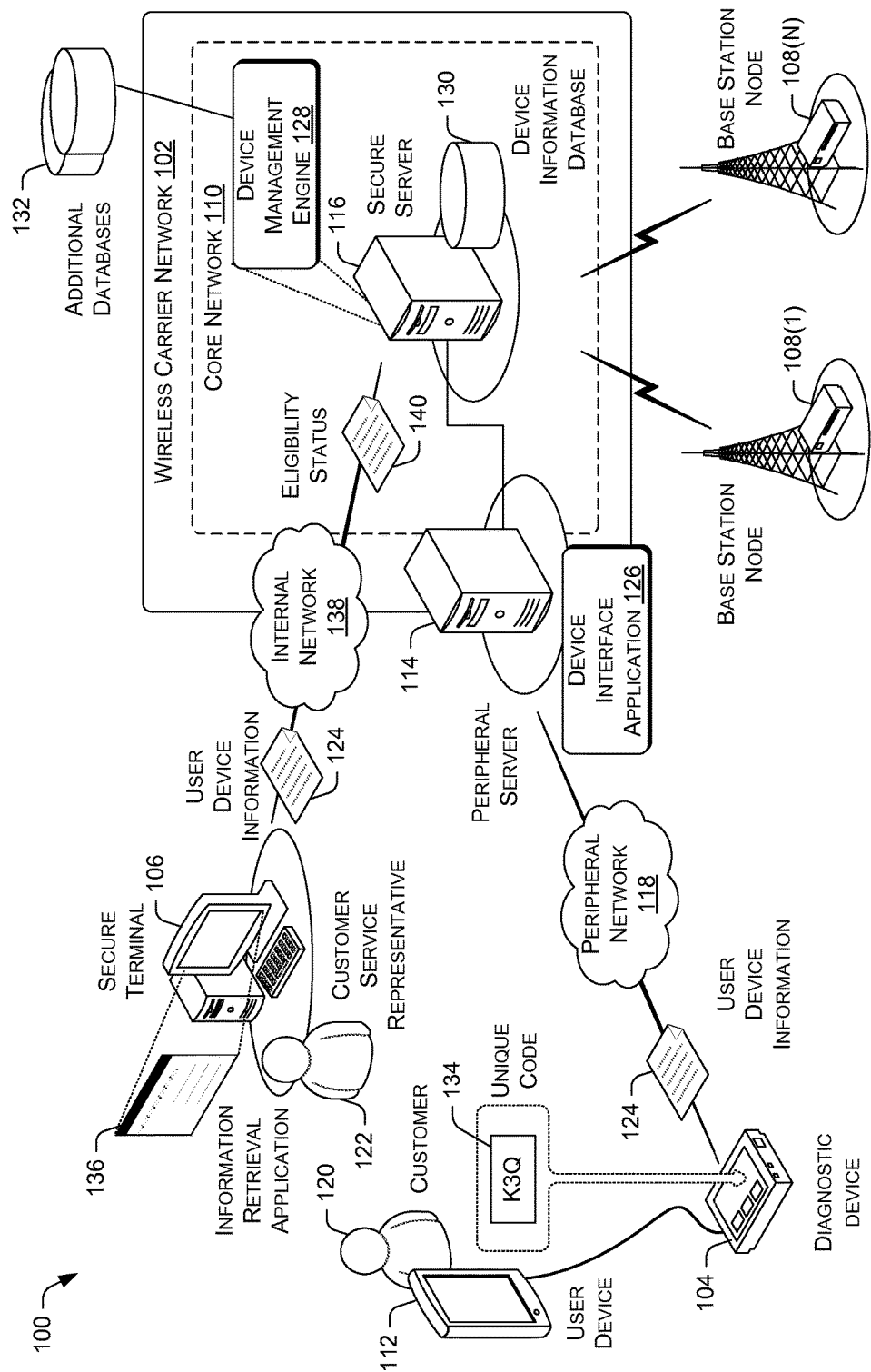
FIG. 1 illustrates an example network architecture for implementing a diagnostic device that performs device diagnostic and detail retrieval for user devices of a wireless carrier network.

This disclosure is directed to techniques for using a diagnostic device to automatically generate a unique code for a user device, in which the unique code enables a retrieval of user device information of the user device from a server. In various embodiments, a customer service representative may initially couple the diagnostic device to a user device of a customer via a wired connection. The customer service representative may make such a connection after obtaining a consent of the customer. Following the coupling, the diagnostic device may automatically retrieve user device information from the user device via the wired connection. Subsequently, the diagnostic device may send the user device information to a server of a wireless carrier network. In turn, the server of the wireless carrier network may generate a unique code that is associated with user device information of the user device. The unique code is delivered by the server to the diagnostic device for presentation on a display of the diagnostic device.

Subsequently, the unique code may be entered by the customer service representative into a user device information retrieval application of a secure terminal that connects to the server. Following the receipt of the unique code by the server from the secure terminal, the server may send the user device information corresponding with the unique code to the secure terminal. In some embodiments, the server may further send an eligibility status of the user device along with the user device information to the secure terminal. The eligibility status of the user device may indicate whether the user device is eligible for a device return, device return, or a device upgrade. The user device information and the eligibility status of the user device may be displayed by the user device information retrieval application of the secure terminal. In at least one embodiment, the user device information retrieval application may also display suggested modifications to the software configuration of the user device in order to make the user device eligible for the return, exchange, or upgrade. Accordingly, the device information retrieval application may assist a customer service representative in determining whether to accept the user device of the user for return, exchange, or upgrade. In additional embodiments, the diagnostic device may have the ability to perform other functionalities via the wired connection with the user device. For example, the diagnostic device may push updates to the user device, run device health diagnostics on the user device, perform data backup for the user device, reset the user device to a default factory setting, and/or so forth. In such embodiments, the diagnostic device may present an interactive menu that enables the customer service representative to select specific functionalities to implement.

The use of the diagnostic device and a uniquely generated code may enable customer service representatives to retrieve the device configuration information and the eligibility status of a user device without searching for the device identification information of the user device. As device identification information of the user device may be difficult at times to locate without knowing the specific software configuration of the user device, the techniques may enable the customer service representative provide assistance to customers in a more expedient manner. Further, the diagnostic device may provide the customer service representative with the ability to perform additional services for the user device. Thus, the techniques may reduce customer service support cost and time, as well as increase customer satisfaction and customer retention. The techniques described herein may be implemented in a number of ways. Example implementations are provided below with reference to the following figures.

Example Network Architecture

FIG. 1 illustrates an example network architecture 100 for implementing a diagnostic device that performs device diagnostic and detail retrieval for user devices of a wireless carrier network. The architecture 100 may include a wireless carrier network 102, a diagnostics device 104, and a secure terminal 106. The wireless carrier network 102 may be operated by a wireless communications carrier. The wireless carrier network 102 may include base station nodes 108(1)-108(N) as well as a core network 110. The base stations 108(1)-108(N) are responsible for handling voice and data traffic between user devices, such as a user device 112, and the core network 110. Alternatively, the user device 112 may access the core network 110 via other communication networks of the wireless communication carrier, third-party providers that connect to the core network, or the Internet. In various embodiments, the user device 112 may be a smart phone, a feature phone, a tablet computer, or another portable communication device.

The core network 110 may provide telecommunication and data communication services to the user devices. For example, the core network 110 may connect the user device 112 to other telecommunication and data communication networks. In various embodiments, the core network 110 of the wireless carrier network 102 may be equipped with a peripheral server 114 and a secure server 116.

The peripheral server 114 may be isolated from the remaining servers and internal components of the core network 110. In at least on instance, the peripheral server 114 may be isolated from the secure server 116 by a firewall, a network filter, or another type of network security mechanism. Accordingly, the network security mechanism may ensure that the data received from the peripheral server 114 and the data that are passed to the peripheral server 114 meet predetermined constraints. For example, the received and distributed data may be limited to data that are related to user device configuration and eligibility status information. Accordingly, the core network 110 may be protected from hacking or other unauthorized access attempts.

The peripheral server 114 may be connected to the diagnostic device 104 via a peripheral network 118. The peripheral network 118 may include a local area network (LAN), a larger network such as a wide area network (WAN), the wireless carrier network 102, and/or the Internet. The peripheral network 118 may include a wired network, a wireless network, or both. The diagnostic device 104 may be deployed at a brick-and-mortar retail location of the wireless communication carrier that operates the wireless carrier network 102.

In operation, a customer 120 may bring the user device 112 into the brick-and-mortar retail location of the wireless communication carrier. The customer 120 may seek the assistance of a customer service representative 122 in returning, exchanging, or upgrading the user device 112. In turn, the customer service representative 122 may have a duty to verify that the user device 112 is in a condition to be returned, exchanged or upgraded. Accordingly, the customer service representative 122 may couple the diagnostic device 104 to the user device 112 via a wired connection. In various embodiments, the wired connection may be achieved using a standard connector or a proprietary connector that plugs into a corresponding interface port of the user device 112. For example, the standard connector may be a universal serial bus (USB) connector, and the proprietary connector may be the Apple® Lightning connector. Alternatively, a wireless connection may be used to connect the diagnostic device with the user device for data communication. For example, the wireless connection may be a Wi-Fi connection, a Bluetooth connection, or another localized wireless connection.

Following the coupling of the diagnostic device 104 to the user device 112, the diagnostic device 104 may automatically retrieve user device information 124 from the user device via the wired connection. In various embodiments, the user device information 124 may include device identification information and device configuration information. The device identification information may include a unique device identifier. The device configuration information may include an indication of whether the operating system of the user device is modified (e.g., rooted, hacked, etc.), a list of software applications that are installed on the user device, an indication of whether specific services (e.g., a device location service, a cloud storage service, etc.) are active on the user device, and/or so forth.

Subsequently, the diagnostic device 104 may send the user device information 124 to a device interface application 126 of the peripheral server 114 via the peripheral network 118. Once the user device information of the user device 112 has reached the peripheral server 114, the device interface application 126 may pass the user device information 124 to the device management engine 128 that resides on the secure server 116. In various embodiments, the device interface application 126 may perform data validation on the user device information to verify the integrity of the user device information. For example, the device interface application 126 may ensure that the use device information is in the proper format and/or is free from viruses, malwares, or other malicious codes.

The device management engine 128 may perform multiple functions following the receipt of the user device information of the user device 112. The device management engine 128 may store the user device information 124 of the user device 112 in a device information database 130. In some instances, the device management engine 128 may access one or more additional databases 132 to obtain additional information regarding the user device 112. The additional database 132 may include databases that are internal to the wireless carrier network 102 and/or external databases that are maintained by outside entities that have business relations with the wireless communication carrier. For example, internal databases may include a customer database that contains information on the payment history, device upgrade history, and/or credit rating of the customer 120 that is associated with the user device. The internal databases may further include a blacklist database that contains a listing of user devices that are banned from using the services provided by the wireless carrier network 102. External databases may include a manufacturer database that holds additional information such as the device first use date, device warranty status, operating system version, and/or product recall information for user devices. Accordingly, the device management engine 128 may retrieve the additional information that are relevant to the user device 112 from the additional databases 132. The device management engine 128 may further supplement the user device information 124 that is stored in the device information database 130 with the relevant additional information.

Subsequently, the device management engine 128 may generate a unique code 134 that is uniquely associated with the user device information 124 of the user device 112. The unique code 134 is then transmitted by the device management engine 128 to the device interface application 126 of the peripheral server 114. In turn, the peripheral server 114 may transmit the unique code 134 to the diagnostic device 104 via the peripheral network 118. The unique code 134 is then displayed by the diagnostic device 104 to the customer service representative 122.

The customer service representative 122 may enter the unique code 134 into an information retrieval application 136 that resides on the secure terminal 106. The secure terminal 106 may be connected to the secure server 116 via an internal network 138. In various embodiments, the secure terminal 106 may be a laptop computer, a desktop computer, a tablet computer, or any other networked computing device that is processing inputs to generate outputs. The internal network 138 may be any secured LAN, WAN, or other network that is access controlled through the use of user authentication, data encryption, or access control technologies. For example, the internal network 138 may be a firewalled Intranet or a Virtual Privacy Network (VPN) that is solely accessible to authorized employees of the wireless communication carrier that operates the wireless carrier network 102. Accordingly, the internal network 138 may be more secure from unauthorized and/or malicious access attempts than the peripheral network 118.

The unique code 134 may be transmitted by the information retrieval application 136 to the secure server 116 via the internal network 138. In turn, the device management engine 128 on the secure server 116 may retrieve the user device information 124 from the device information database 130. In some embodiments, the device management engine 128 may generate an eligibility status 140 for the user device 112 based on the user device information 124. The eligibility status 140 may indicate whether the user device 112 is eligible for a return, an exchange, or an upgrade. For example, if the user device information 124 indicates that the operating system of the user device 112 has been modified, the device management engine 128 may determine that the user device 112 is ineligible. In another example, if the user device information 124 indicates that the user device 112 was reported as being lost or stolen, the device management engine 128 may also determine that the user device 112 is ineligible. In an additional example, if the user device information 124 indicates that the customer 120 who owns the user device 112 is late in payments to the wireless communication carrier, the device management engine 128 may further determine that the user device 112 is ineligible.

The device management engine 128 may send the user device information 124 and the eligibility status 140 of the user device 112 to the secure terminal 106 in exchange for the unique code 134. In turn, the information retrieval application 136 on the secure terminal 106 may display the user device information 124 and the eligibility status 140 to the customer service representative 122. In at least one embodiment, the device management engine 128 may generate suggestions of software configuration modifications to the user device 112 that may make the device eligible for the return, the exchange, or the upgrade for transmission to the secure terminal 106. As a result, the information retrieval application 136 may display such suggestions for possible implementation by on the user device 112. Thus, in some instances, the customer 120 or the customer service representative 122 may implement the suggested software modification on the user device 112. Subsequently, the customer service representative 122 may re-couple the diagnostic device 104 to the user device 112 to repeat the device diagnostic and detail retrieval procedures, with the hope of receiving an indication that the user device is eligible for the return, the exchange, or the upgrade.

Example Diagnostic Device Components

Figure 2:
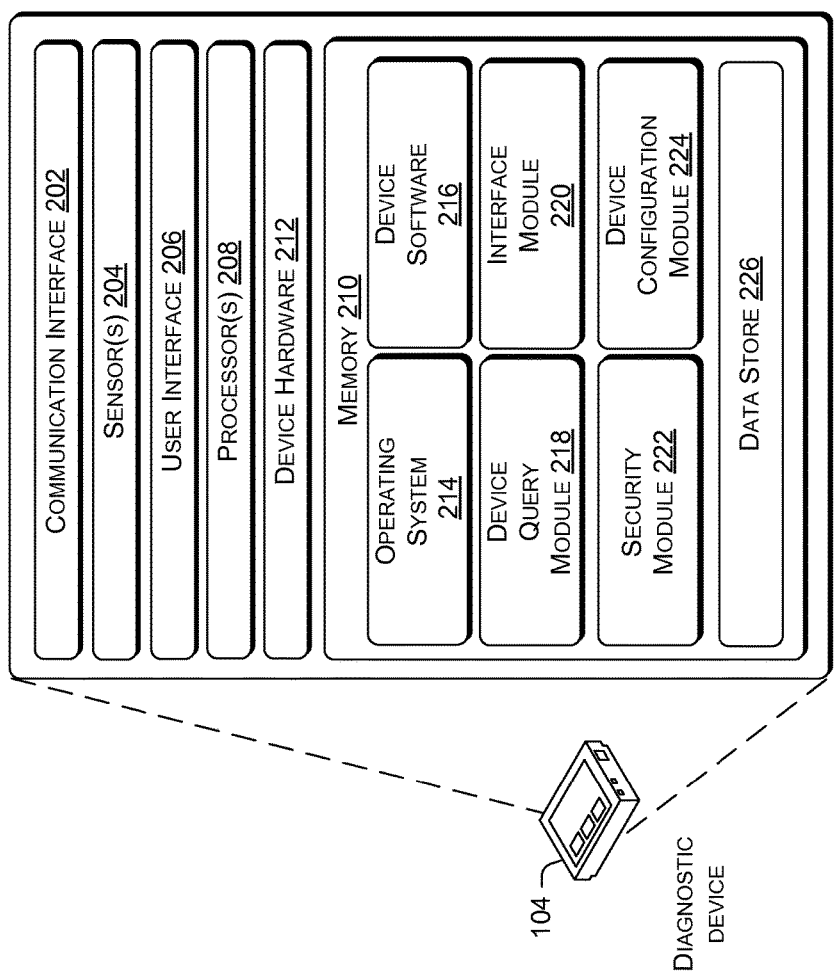
FIG. 2 is a block diagram showing various components of an illustrative diagnostic device that performs device diagnostic and detail retrieval for user devices of a wireless carrier network.

FIG. 2 is a block diagram showing various components of the diagnostic device 104 that performs device diagnostic and detail retrieval for user devices of a wireless carrier network. The diagnostic device 104 may be enclosed in a physical case that is equipped with one or more tie down features. The tie down features may enable the diagnostic device 104 to be physically secured to another object. For example, the tie down features may include a loop for threading a security cable, a connector for connecting with the security cable, a mounting bracket for mounting the physical case to a surface, and/or so forth. The diagnostic device 104 may be further equipped with a communication interface 202, one or more sensors 204, user interface 206, one or more processors 208, memory 210, and other device hardware 212.

The communication interface 202 may include wireless and wired communication components that enable the diagnostic device to communicate with a user device, such as the user device 112, as well as the peripheral server 114 of the wireless carrier network 102. In various embodiments, the wireless communication components may include a Wi-Fi transceiver. The Wi-Fi transceiver may include a wireless network interface controller (NIC) and a Wi-Fi radio. The Wi-Fi transceiver may enable the diagnostic device 104 to communicate with the peripheral server 114 via a wireless access point on the peripheral network 118.

The wired communication components may include an Ethernet interface, a USB interface, or other I/O interfaces. The Ethernet interface may provide a way for the diagnostic device 104 to connect to the peripheral network 118 and communicate with the peripheral server 114. The diagnostic device 104 may use the USB interface to connect with a user device, such as the user device 112. However, the USB interface may be substitute with any other I/O interface that is supported by a user device. The sensors 204 may include a proximity sensor, a global positioning system (GPS) receiver, or an E-GPS receiver. The proximity sensor may detect movement of objects that are proximate the diagnostic device 104. The GPS sensor may detect orientation, movement, and geolocation of the diagnostic device 104.

The user interface 206 may enable a user to provide inputs and receive outputs from the diagnostic device 104. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

Each of the processors 208 may be a single-core processor, a multi-core processor, a complex instruction set computing (CISC) processor, or another type of processor. The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 212 may include other hardware that is typically located in a mobile computing device. For example, the device hardware 214 may include a power source, signal converters, antennas, hardware decoders and encoders, digital signal processors (DSPs), graphic processors, and/or the like that enable the diagnostic device 104 to execute applications and communicate with other devices.

The one or more processors 208 and the memory 210 of the diagnostic device 104 may implement an operating system 214, device software 216, a device query module 218, an interface module 220, a security module 222, and a device configuration module 224. The software and modules may include routines, program instructions, objects, and/or data structures that perform particular tasks or implement particular abstract data types.

The operating system 214 may include components that enable the diagnostic device 104 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the device software 216 and the various modules. The operating system 214 may include a presentation component that presents the output (e.g., display the data on an electronic display, store the data in memory, transmit the data to another electronic device, etc.). Additionally, the operating system 214 may include other components that perform other functions generally associated with an operating system. The device software 216 may include software components that enable the user device to perform additional functions. For example, the device software 216 may include basic input/output system (BIOS), bootrom, or a bootloader that boots up the diagnostic device 104 and executes the operating system 214 following power up of the device. The device software 216 may also include drivers for the various hardware components and interface libraries for interfacing with multiple user device operating systems. The drivers may include a display driver, a Wi-Fi NIC driver, a USB driver, and/or so forth.

The device query module 218 may interrogate a user device, such as user device 112, for user device information. The device query module 218 may perform such an interrogation following an establishment of the wired communication between the user device and the diagnostic device 104. In some embodiments, the device query module 218 may prompt a user to enter an authentication credential prior to performing the interrogation. Accordingly, the device query module 218 may perform the interrogation after the authentication credential is verified against an internal database of authorized authentication credentials.

The user device information that is obtained for a user device may include device identification information and device configuration information. The device identification information may include an International Mobile Station Equipment Identity (IMEI), Mobile Equipment Identifier (MEID), Integrated Circuit Card ID (ICCID), Electronic Serial Number (ESN), and/or so forth, of the user device. The device configuration information may include an indication of whether the operating system of the user device is modified (e.g., rooted, hacked, etc.), a list of software applications that are installed on the user device, an indication of whether specific services (e.g., a device location service, a cloud storage service, etc.) are active on the user device, and/or so forth.

The interface module 220 may send user device information of each user device to the device interface application 126 on the peripheral server 114. The user device information may be route to the secure server 116 via the peripheral network 118. For example, the interface module 220 may transmit the user device information 124 of the user device 112 to the device interface application 126. In turn, the device interface application 126 may transmit the user device information 124 to the device management engine 128. In various embodiments, the interface module 220 may encrypt the user device information of a user device for transmission, such that the user device information may be decrypted by the device interface application 126. In such embodiments, the interface module 220 may use a symmetric encryption algorithm or an asymmetric encryption algorithm to perform the encryption.

In return, the interface module 220 may receive a unique code, such as the unique code 134, which corresponds to a set of user device information that is transmitted to the device interface application 126. The interface module 220 may receive the unique code from the device interface application 126 on the peripheral server 114. The unique code may be generated by the device management engine 128 on the secure server 116. For example, in return for the user device information 124, the device management engine 128 may generate the unique code 134 for delivery by the device interface application 126 to the diagnostic device 104. Following the receipt of the unique code, the interface module 220 may trigger a presentation of the unique code on the display of the diagnostic device 104. In some embodiments, a unique code may be encrypted by the device interface application 126 on the peripheral server 114, such that the unique code may be decrypted by the interface module 220. In such embodiments, the interface module 220 may use a symmetric encryption algorithm or an asymmetric encryption algorithm to perform the decryption.

In some embodiments, the diagnostic device 104 is to be activated prior to being permitted to exchanging information with the device management engine 128 on the peripheral server 114. The activation of the diagnostic device 104 may involve the interface module 220 generating a public-private key pair and an activation code. The public-private key pair may include a public encryption key and a private encryption key that are used for asymmetric cryptograph. The activation code may be a randomly generated alphanumeric code. For example, the activation code may be a 6-character string in which ambiguous characters or letters are excluded.

Subsequently, the interface module 220 may send a certificate signing request to the device activation service. The certificate signing request may include a certificate, the activation code, the public encryption key, and a device identifier of the diagnostic device 104. In various embodiments, the certificate may be a secure socket layer (SSL) certificate, and the device identifier may be a media access control (MAC) address of a network interface card (NIC) of the diagnostic device 104.

In response to the certificate signing request, the device activation service may store the certificate, the activation code, the public encryption key, and the MAC address in a data store on the secure server 116. Subsequently, the device activation service may validate the MAC address against a MAC address list of authorized diagnostic devices. Accordingly, if the MAC address of the diagnostic device 104 is a valid, the device activation service may send a code display request to the diagnostic device 104. The interface module 220 of the diagnostic device 104 may cause the activation code to be presented on a display of the diagnostic device in response to the code display request.

Following such display, the customer service representative 122 may enter a credential and the activation code as displayed by the diagnostic device 104 at a device activation interface provided by the information retrieval application 136 of the secure terminal 106. In turn, the information retrieval application 136 may send the credential and the inputted activation code that is entered at the secure terminal 106 to the device activation service. In turn, the device activation service may validate the user credential and the inputted activation code. For example, the user credential may be an employee credential issued to the customer service representative. In various embodiments, the user credential may be validated against an authorized user credential database, and the inputted activation code may be validated against the previously stored activation code from the diagnostic device 104.

Accordingly, assuming that the device activation service finds that both the user credential and the received activation code are valid, the device activation service may sign the certificate associated with the inputted activation code using the public encryption key. However, in an event that a diagnostic device is compromised, the device activation service may add the public encryption key generated by that diagnostic device to a revocation list as invalid. Subsequently, the device action service may send the signed certificate to the diagnostic device 104. Once the diagnostic device 104 has received the signed certificate, the interface module 220 may validate the signed certificate using the private encryption key. Assuming that the certificate is valid, the diagnostic device 104 is deemed to be activated, and the interface module 220 may use the certificate to secure further information communication with the device management engine 128.

The security module 222 may prevent a malicious party from using the diagnostic device 104 to compromise the security integrity of the wireless carrier network 102. In some embodiments, the security module 222 may be configured to cause the diagnostic device 104 to automatically shut down if the diagnostic device 104 is connected to a core network component other than the peripheral server 114. In such embodiments, the security module 222 may listen for a heartbeat signal that is periodically transmitted by the device activation service on the peripheral server 114. Accordingly, if the security module 222 fails to detect the presence of the heartbeat signal from a core network component that is connected to the diagnostic device 104 within a predetermined period of time, the security module 222 may trigger an automatic shutdown of the diagnostic device 104. Such an automatic shutdown may prevent the improper connection of the diagnostic device 104 to the internal network 138 of the wireless carrier network 102.

In other embodiments, the device management engine 128 may cause the security module 222 to trigger an automatic shutdown of the diagnostic device 104. In such embodiments, the device management engine 128 may detect that the diagnostic device 104 is communicating with the secure server 116 from a network address that belong to an internal network, such as the internal network 138. In such an instance, the device management engine 128 may send a shutdown command to the security module 222. In response to the shutdown command, the security module 222 may perform a shutdown of the diagnostic device 104.

In additional embodiments, the device management engine 128 may also send a shutdown command to the security module 222 following a determination that the diagnostic device 104 is connected at a network address that is not an authorized network address. In such embodiments, the device management engine 128 may maintain a list of authorized network addresses that are associated with brick-and-mortar retail locations of the wireless communication carrier. Instead of sending a shutdown command, the device management engine 128 may alternatively send a wipe command. Upon receiving the wipe command, the security module 222 may initiate a wipe of the memory 210 of the diagnostic device 104. The memory wipe may completely erase the memory 210 of the diagnostic device. Alternatively, the memory wipe may be a partial wipe that erases the information stored in the data store 226 while leaving the remaining data in the memory 210 intact.

In further embodiments, the security module 222 may periodically report its geolocation to the device management engine 128 as long as the diagnostic device is communicating with the secure server 116. The security module 222 may obtain the geolocation of the diagnostic device 104 by querying an external IP location service for the geolocation that corresponds to an IP address used by the diagnostic device 104 to connect to a network, such as the peripheral network 118. Alternatively, the security module 222 may acquire its geolocation from the GPS receiver or the E-GPS receiver that is built into the diagnostic device 104. In turn, the device management engine 128 may determine whether the reported geolocation of the diagnostic device 104 is within a predetermined distance from a designated geolocation that is assigned to the diagnostic device 104. The designated geolocation may be a location of the retail store to which the diagnostic device 104 is deployed. Accordingly, if the device management engine 128 determines that a current geolocation of the diagnostic device 104 is outside of the predetermined distance from the designated geolocation, the device management engine 128 may send a disable command to the diagnostic device 104.

Upon receiving the disable command, the security module 222 may disable all functionalities of the diagnostic device 104 with the exception of the ability to periodically report its geolocation to the device management engine 128. The reported geolocation of the diagnostic device 104 may assist the wireless communication carrier in locating the unauthorized user that is operating the diagnostic device 104. Alternatively, upon receiving the disable command, the security module 222 may initiate a wipe of the memory 210 of the diagnostic device 104 or an automatic shutdown of the diagnostic device. The memory wipe may completely erase the memory 210 of the diagnostic device. Alternatively, the memory wipe may be a partial wipe that erases the information stored in the data store 226 while leaving the remaining data in the memory 210 intact.

In still other embodiments, the security module 222 may have the ability to periodically determine whether its current geolocation is within a predetermined distance of a designated geolocation of the diagnostic device 104. The designated geolocation may be encoded into a secure memory area of the diagnostic device 104. Accordingly, when the security module 222 determines that the current geolocation of the diagnostic device 104 is outside of a predetermined distance of the designated geolocation, the security module 222 may initiate the automatic shutdown, the functionality disablement, or the wipe of the memory 210 in a similar manner.

The device configuration module 224 may provide options for configuring a user device that is connected to the diagnostic device 104. In various embodiments, the device configuration module 224 may generate an interface menu that is presented by a display of the diagnostic device 104. The interface menu may include options for performing various tasks. The tasks may include pushing updates to a user device, running device health diagnostics for the user device, performing a content backup for the user device, resetting the user device to a default factory setting, and/or so forth. The content backup may additionally allow a selection of backing up to a local storage device (e.g., the diagnostic device 104, a USB memory stick plugged into the diagnostic device 104, etc.) or to a cloud storage space.

Accordingly, upon receiving a selection of a menu option, the device configuration module 224 may perform the corresponding task for the user device. For example, the device configuration module 224 may download device update files from the device management engine 128 and initiate an installation of the device update files onto a user device. In another example, the device configuration module 224 may execute a device health diagnostic algorithm that checks the memory of a user device for viruses, malwares, misconfigurations, and/or other errors.

The data store 226 may include one or more databases, such as relational databases, object databases, object-relational databases, and/or key-value databases that store data. The data store 226 may store data that are obtained and/or processed by the various software applications and modules of the diagnostic device 104. For example, the data store 228 may store user device information, unique codes, device health diagnostic algorithms, device updates for user devices, data backups for user devices, and/or other data.

In some embodiments, the physical case of the diagnostic device 104 may include additional features that protect the integrity of the diagnostic device 104. For example, the memory 210 may be in the form of a removable flash memory card that is accessible through a portal built into the physical case. In such an example, the portal may be removable covered by a hatch that is secured by one or more fasteners to the physical case. The hatch may prevent the accidental or unauthorized removal of the memory 210. In another example, the diagnostic device 104 may be equipped with a video output port, such as a high-definition multimedia interface (HDMI) port or a digital visual interface (DVI) port. In such an example, the ports may be removably shielded by a cover that is secured to the physical case by one or more fasteners. The cover may prevent the accidental or unauthorized use of the video output port.

Example Anti-Theft Recovery Server Components

Figure 3:
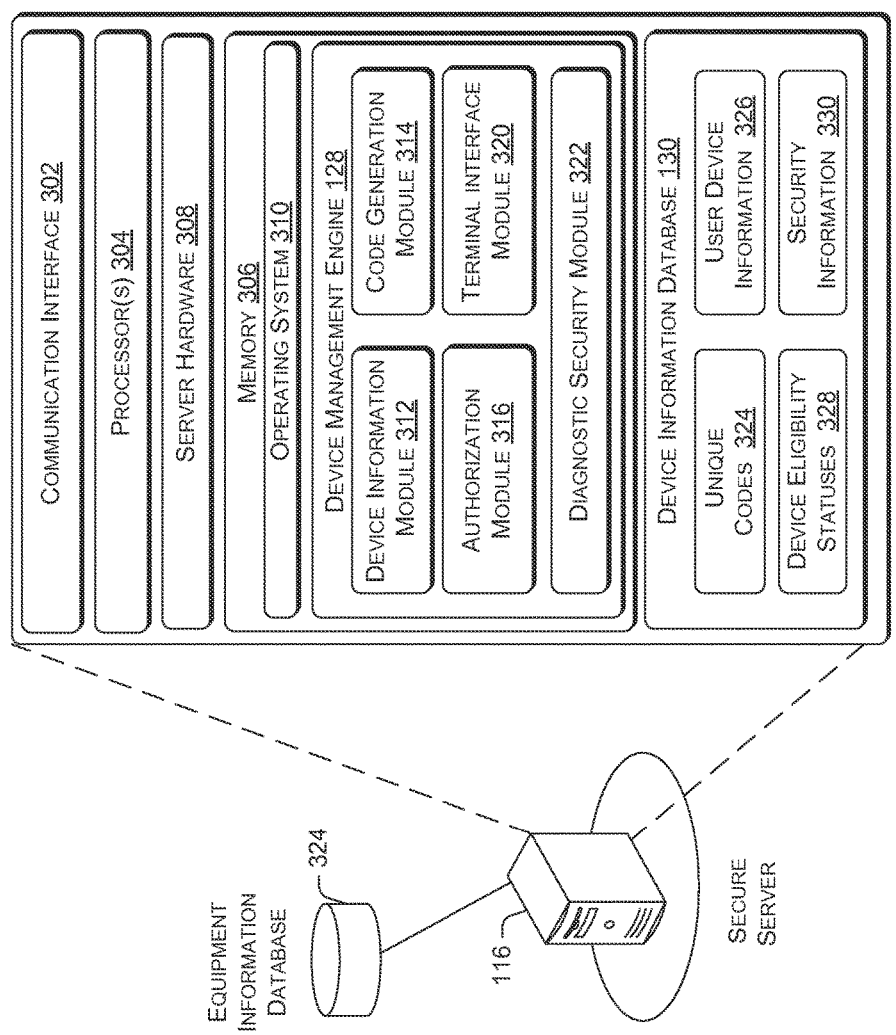
FIG. 3 is a block diagram showing various components of an illustrative secure server that interacts with a diagnostic device that performs device diagnostic and detail retrieval for user devices of a wireless carrier network.

FIG. 3 is a block diagram showing various components of the secure server 116 that interacts with a diagnostic device that performs device diagnostic and detail retrieval for user devices of a wireless carrier network. The secure server 116 may include a communication interface 302, one or more processors 304, memory 306, and server hardware 308. The communication interface 302 may include wireless and/or wired communication components that enable the server to transmit data to and receive data from other networked devices. The server hardware 308 may include additional hardware that performs user interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the secure server 116 may implement an operating system 310 and the device management engine 128. The operating system 310 may include components that enable the secure server 116 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The device management engine 128 may include a device information module 312, a code generation module 314, an authorization module 316, a terminal interface module 318, and a diagnostic security module 320. The device information module 312 may receive user device information of each user device from the device interface application 126 on the peripheral server 114. In turn, the device information module 312 may store the user device information of each user device into the device information database 130. In various embodiments, the device information database 130 may be a relational database, an object database, an object-relational database, and/or a key-value database that stores data. Further, the device information module 312 may retrieve additional information regarding a user device from one or more internal or external databases to supplement the user device information of a user device.

Accordingly, the user device information of a user device that is stored in the device information database 130 may include device identification information (e.g., IMEI, MEID, etc.) and device configuration information. The device configuration information may include an indication of whether the operating system of the user device is modified (e.g., rooted, hacked, etc.), a list of software applications that are installed on the user device, an indication of whether specific services (e.g., a device location service, a cloud storage service, etc.) are active on the user device, and/or so forth. The user device information of the user device may further include the payment history, device upgrade history, and/or credit rating of a customer that is associated with the user device, an indication of whether the user device is banned from using the services provided by the wireless carrier network 102. Additionally, the user device information of the user device may also include the device first use date, device warranty status, operating system version, and/or product recall information for the user device. Once the user device information of the user device is stored, the device information module 312 may prompt the code generation module 314 to generate a corresponding unique code.

In alternative embodiments, the device information module 312 may store user device information that is obtained from an equipment information database 322 of the wireless carrier network 102, instead of user device information that is obtained from the diagnostic device 104. The equipment information database 322 may include information that the wireless carrier network 102 customarily stores about user devices. For example, the data regarding a user device that the equipment information database stores may include user device identification information, device first use date, device warranty status, operating system version, and/or so forth.

In such embodiments, the customer service representative 122 may enter a specific feature access code, such as an Unstructured Supplementary Service Data (USSD) message code, into a user device. The USSD message code may signify a user device information retrieval request. The USSD message code along with a user identifier (e.g., a Mobile Station International Subscriber Directory Number (MSISDN) are routed to a dedicated server on the wireless carrier network 102, such as a USSD server. The USSD Server may retrieve a user device identifier, such as an IMEI, that is associated with the user identifier. In at least one embodiment, the USSD Server may retrieve the IMEI associated the user identifier from an equipment identity register (EIR) of the wireless carrier network 102. Subsequently, the USSD Server may translate the specific feature access code into an information query command, and pass the user device identifier, along with the query command, to the device information module 312. In return, the device information module 312 may query the equipment information database 322 for user device information associated with the user device identifier. The device information module 312 may also query one or more other internal or external database for additional information that supplements the user device information of the user device. Subsequently, the device information module 312 may store user device information of the user device in the device information database 130, and prompt the code generation module 314 to generate a corresponding unique code.

The code generation module 314 may generate a unique code that corresponds to the user device information of a user device. For example, the unique code may be associated with a user device identifier included in the user device information, in which the user device identifier is a primary key for looking up the user device information. The code generation may be performed under the direction of the device information module 312. The unique code may be generated at random by the code generation module 314. The unique code may be an alphanumeric code or a machine-readable code. For example, the alphanumeric code may be a 3-character string that is designed for easy viewing and data entry. In some instances, the code generation module 314 may be configured to refrain from generating certain-character strings. These excluded character strings may include strings that can be interpreted to have offensive meanings or connotations, such as short forms of swear words, illegal acts, or criminal behavior. These excluded character strings may also include strings with ambiguous letters or numbers. For example, a zero may be interpreted as the letter "O", a capitalized "i" may be mistaken for the letter "l". Accordingly, the excluded character strings may be stored in a blacklist, and the code generation module 314 may retry and generate a new unique code upon generating a unique code that is in the blacklist.

The machine-readable code may be a two-dimensional code, such as barcode, a QR® code, an Aztec code, a MaxiCode, or another code that is not readily decipherable to a human user. Accordingly, in such instances, the secure terminal 106 may be equipped with hardware (e.g., a barcode reader, a code scanner, etc.) and software (e.g., an image recognition algorithm, a code conversion algorithm, etc.) for scanning the machine-readable code as presented on a display of the diagnostic device 104, as well as deciphering the machine-readable code. Subsequently, the code generation module 314 may provide the unique code to the peripheral server 114, such that the device interface application 126 may pass the unique code to the diagnostic device 104 for display.

In embodiments in which generation of the unique code is ultimately initiated by an entry of the specific feature access code at a user device, the code generation module 314 may generate a unique code in alphanumeric format. Further, the code generation module 314 may be configured to send the unique code to the USSD server. In turn, the USSD server may transmit the unique code back to the user device that originated the specific feature access code in a USSD reply message, such that the unique code may be presented on a display of the user device.

In some instances, each of the unique codes that are generated by the code generation module 314 may be configured to expire after a predetermined time period. In this way, a unique code may be used to retrieve the corresponding user device information within the predetermined time period. In such instances, the code generation module 314 may maintain a list of valid unique codes. Accordingly, the code generation module 314 may remove a unique code from the valid code list after the unique code has been on the list for the predetermined time period. The implementation of limited time periods of validity for unique codes may reduce instances of accidental or intentional misuse of the unique codes. In some embodiments, each unique code that has expired for a predetermined time interval may be regenerated by the code generation module 314 for use with user device information of a new use device.

The authorization module 316 may determine whether a user device is eligible for a return, an exchange, or an upgrade based on the user device information obtained for the user device. Accordingly, the authorization module 316 may include machine logic that generates an eligibility status based on multiple variables. For example, the authorization module 316 may determine that a user device is ineligible if the user device information indicates that the operating system of the user device has been modified. In another example, the authorization module 316 may determine that a user device is ineligible if the user device information indicates that unauthorized software application are installed or active on the user device. In other examples, the user device may be determined to be ineligible for other reasons, such as the user device being reported as lost or stolen, the customer being late in payments to the wireless communication carrier, and/or so forth. In at least one embodiment, the authorization module 316 may generate suggestions of software configuration modifications to an ineligible user device that may make the device eligible for the return, the exchange, or the upgrade. The authorization module 316 may store the eligibility status and/or modification suggestions for a user device in the device information database 130.

The terminal interface module 318 may receive a unique code that is provided by a secure terminal 106 via the internal network 138. The unique code may be received by an information retrieval application 136 on the secure terminal 106. The terminal interface module 318 may validate the unique code against the list of valid unique codes. Accordingly, if the terminal interface module 318 determines that the unique code is still valid, the terminal interface module 318 may retrieve the user device information of the user device that corresponds to the unique code from the device information database 130. For example, the terminal interface module 318 may look up the primary key of the user device information of the user device based on the unique code, and the user device information is then further retrieved. Subsequently, the terminal interface module 318 may activate the authorization module 316 to determine an eligibility status for the user device based on the retrieved user device information. In some embodiments, the authorization module 316 may also provide the device activation service that activates a diagnostic device for use with the device management engine 128.

The user device information and the eligibility status of the user device are then transmitted by the terminal interface module 318 to the secure terminal 106. Subsequently, the information retrieval application 136 on the secure terminal 106 may display the device information and the eligibility status of the user device. In instances in which the eligibility status indicates that the user device is ineligible, the eligibility status information may further include suggestions of software configuration modifications to the user device that may make the device eligible for the device return, the device exchange, or the device upgrade. However, if the terminal interface module 318 determines that the unique code is not valid, the terminal interface module 318 may send an error message to the information retrieval application 136 on the secure terminal 106. The error message may indicate that the unique code is invalid or expired.

The diagnostic security module 320 may interact with diagnostic devices to prevent unauthorized use of the device. For example, the diagnostic security module 320 may detect that the diagnostic device 104 is communicating with the secure server 116 from a network address that belongs to an internal network, such as the internal network 138. In such an example, the diagnostic security module 320 may send a shutdown command to the security module 222. In response to the shutdown command, the security module 222 may perform a shutdown of the diagnostic device 104.

In other examples, the diagnostic security module 320 may also send a shutdown command or a wipe command to the security module 222 of the diagnostic device 104 following a determination that the device is incorrectly connected at a network address that is not an authorized network address. In such embodiments, the diagnostic security module 320 may maintain a list of authorized network addresses that are associated with brick-and-mortar retail locations of the wireless communication carrier. The shutdown command may cause the security module 222 to perform a shutdown of the diagnostic device 104, while the wipe command may cause the security module 222 to initiate a wipe of the memory 210 of the diagnostic device 104.

In additional examples, the diagnostic security module 320 may periodically receive the geolocation of the diagnostic device 104 as long as the device is communicating with the secure server 116. The diagnostic security module 320 may determine whether the reported geolocation of the diagnostic device 104 is within a predetermined distance from a designated geolocation that is assigned to the diagnostic device 104. The designated geolocation may be a location of the retail store to which the diagnostic device 104 is deployed. Accordingly, if the diagnostic security module 320 determines that a current geolocation of the diagnostic device 104 is outside of the predetermined distance from the designated geolocation, the diagnostic security module 320 may send a disable command to the diagnostic device 104 that disables the device.

The device information database 130 may store information that are used by the secure server 116, such as the unique codes 324, user device information 326, device eligibility statuses 328, and security information 330. The unique codes 324 may include a list of valid unique codes that may be used to retrieve corresponding user device information. The user device information 326 may include user device information of multiple user devices, in which the user device information of each user device is collected from one or more sources. The device eligibility statuses 328 include the eligibility statuses of the use devices for return, exchange, and/or upgrade as determined by the authorization module 316. The security information 330 may include data that is used by the diagnostic security module 320, such as a list of authorized network addresses, designated geolocations assigned to user devices, network addresses of internal networks, and/or so forth.

While the modules of the device management engine 128 have been described as being located in the secure server 112, such modules may also be implemented on one or more additional servers of the core network 110 in other embodiments. Accordingly, the device management engine 128 may be implemented by multiple servers of the core network 110.

Example User Interface

Figure 4:
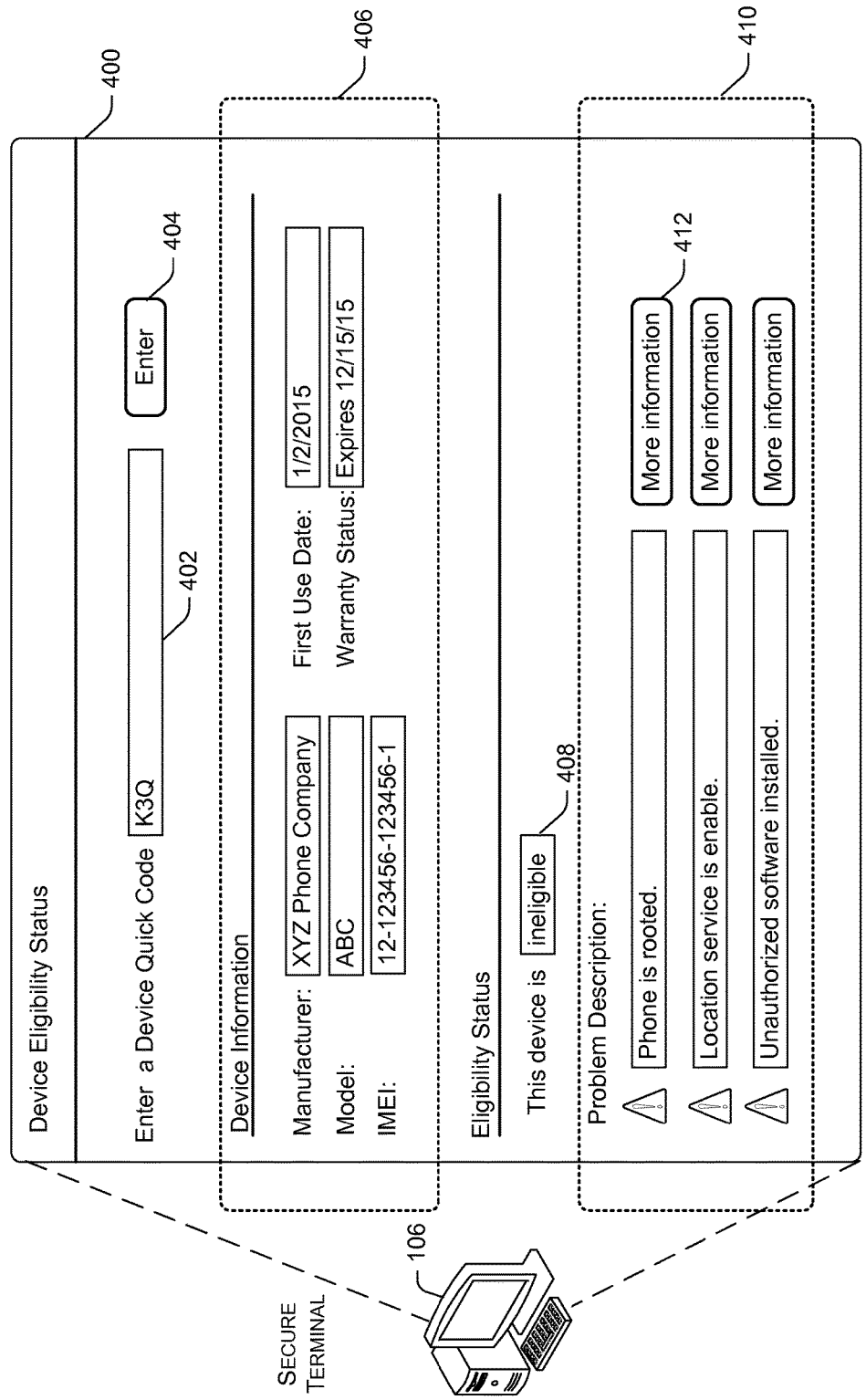
FIG. 4 is an illustrative user interface of a user device information retrieval application for viewing device information and diagnostic details of a user device that is associated with a wireless carrier network.

FIG. 4 is an illustrative user interface 400 viewing device information and diagnostic details of a user device that is associated with a wireless carrier network. The user interface 400 may be displayed by the information retrieval application 136 executing on the secure terminal 106. The user interface 400 may include a unique code input field 402 for entering a unique code that is assigned to a user device. Following the entry of the unique code into the unique code input field 402, a user may activate the submission button 404 to cause the information retrieval application 136 to send the unique code to the device management engine 128 on the secure server 116. In return, the information retrieval application 136 may receive user device information that is displayed in device information display section 406 of the user interface 400. For example, the user device information that is displayed may include a manufacturer of the user device, a model name of the user device, a user device identifier of the user device, a device first use date, a device warranty status, and/or so forth.

The user interface 400 may further display a device eligibility status section 408. The device eligibility status section 408 may show whether the user device is eligible for a return, an exchange, or an upgrade. In the event that the user device is ineligible, the user interface 400 may further display a problem description section 410. The problem description section 410 may indicate the one or more causes of the user device ineligibility. For example, the causes may include that the operating system of the phone is modified (i.e., rooted), a geolocation application on the user device is enabled, or that unauthorized software is installed on the user device, and/or so forth. In some embodiments, each of the listed causes of the ineligibility may be accompanied by an additional information option, such as the additional information option 412. Accordingly, the selection of an additional information option that is associated with a listed cause may lead the information retrieval application 136 to display a new user interface. The new interface may provide additional details regarding the cause. In at least one embodiment, the additional details may further include suggestions of software configuration modifications to the user device that may remedy the cause of the user device ineligibility.

In other embodiments, the causes of the user device ineligibility may be presented in other formats by the user interface 400. For example, potential causes of ineligibility may be displayed as a list of parameters, in which different colors may be used to indicate whether a particular parameter is causing the user device ineligibility, e.g., a red color indicator may indicate the particular parameter is problematic, while a green color indicator may indicate that the particular parameter is non-problematic. Other indicators that may be used to show causes of ineligibility may include checkboxes, dialogue boxes, different grouping of icons that represent parameters, and/or so forth.

Example Processes

Figure 5:
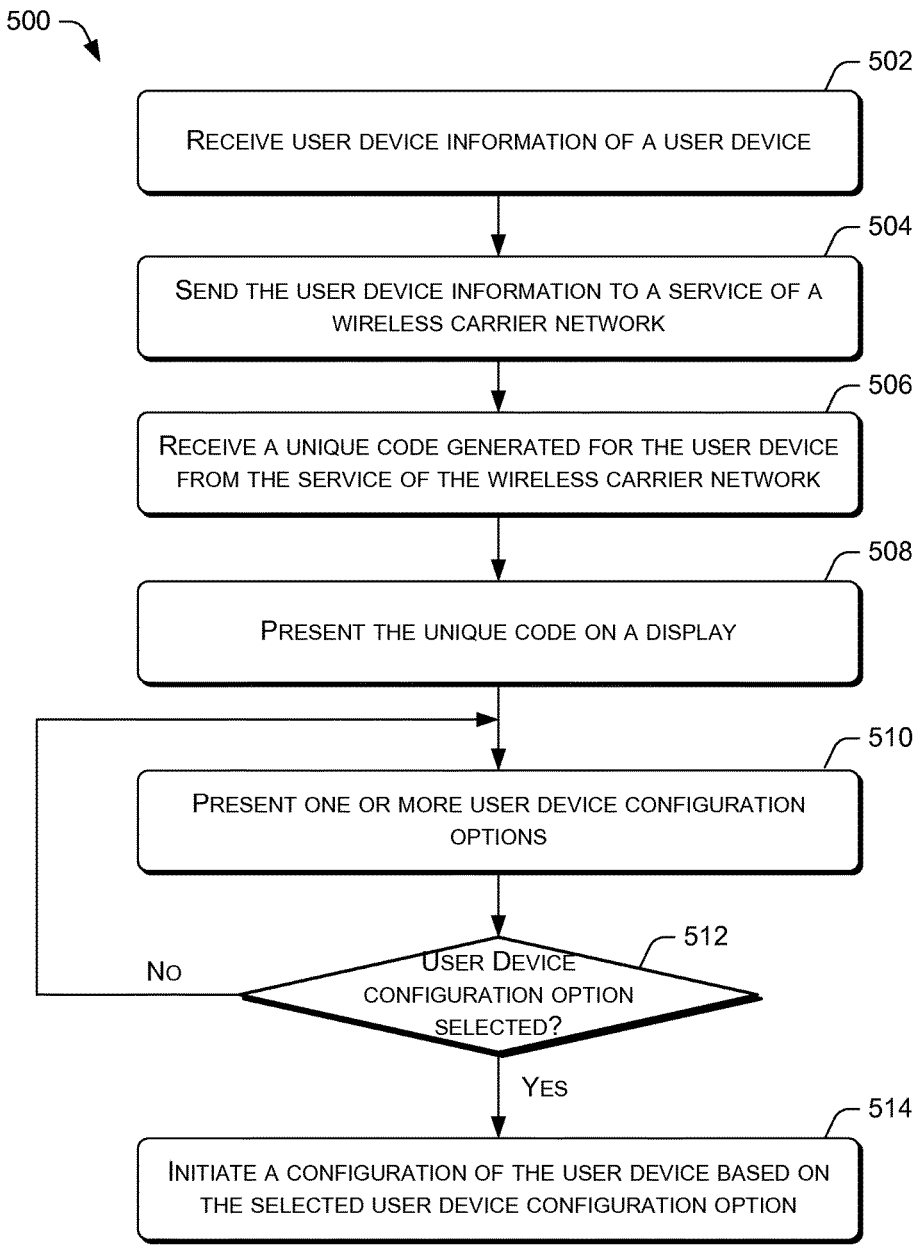
FIG. 5 is a flow diagram of an example process for a diagnostic device to present a unique code used to retrieve device information and diagnostic details of a user device and initiate a configuration of the user device based on a configuration option.
Figure 6:
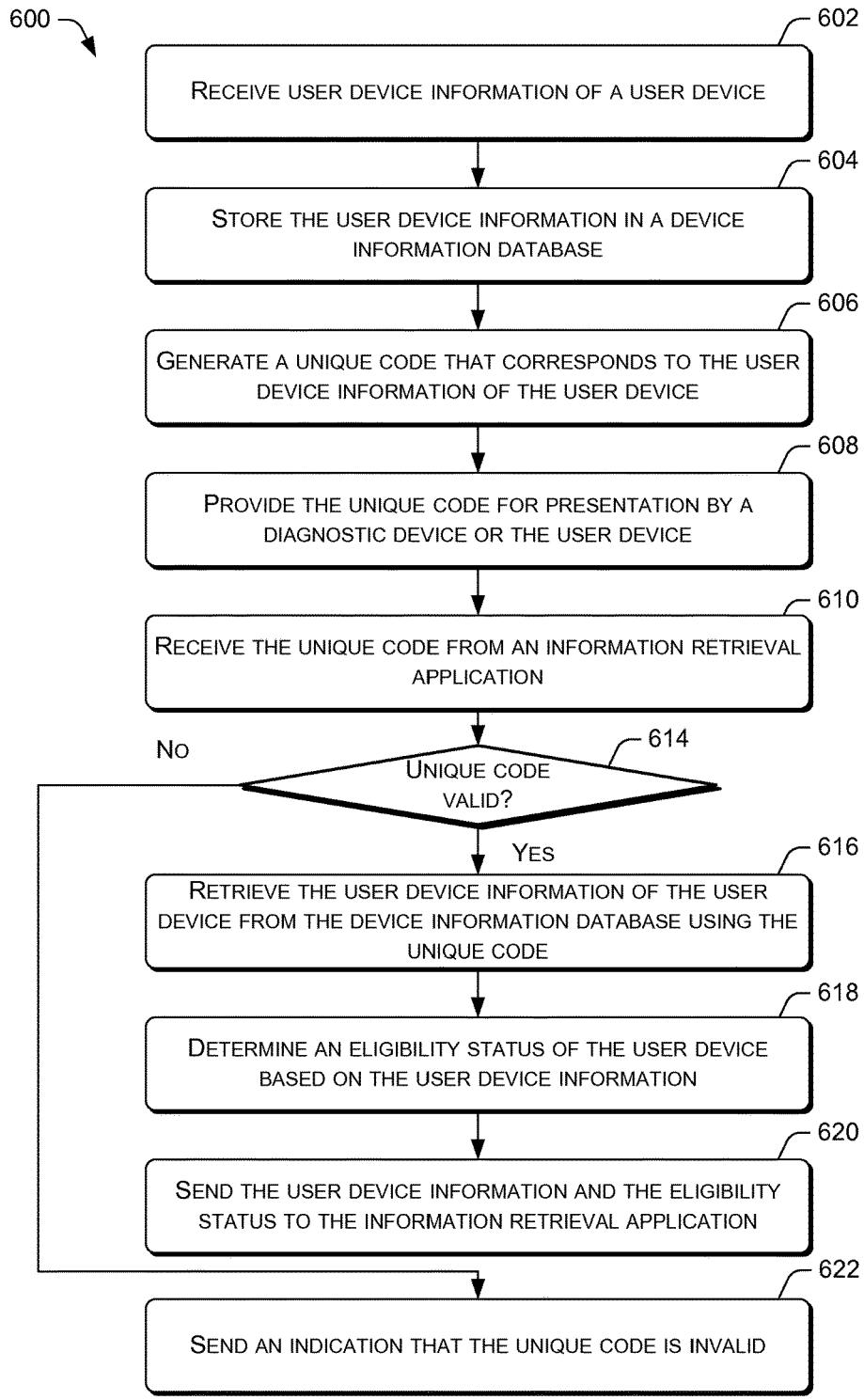
FIG. 6 is a flow diagram of an example process for device management services of a wireless carrier network to generate a unique code and use the unique code to present user device information to a user device.

FIGS. 5 and 6 present illustrative processes 500 and 600 for performing device diagnostic and detail retrieval. Each of the processes 500 and 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to the architecture 100 of FIG. 1.

FIG. 5 is a flow diagram of an example process 500 for a diagnostic device to present a unique code used to retrieve device information and diagnostic details of a user device and initiate a configuration of the user device based on a configuration option. At block 502, the diagnostic device 104 may receive user device information of a user device. In various embodiments, the diagnostic device 104 may obtain the user device information by connecting to the user device via a wired communication connection, and then querying an operating system of the user device for the user device information through the communication connection. The user device information may include device identification information and device configuration information.

At block 504, the diagnostic device 104 may send the user device information to a service of the wireless carrier network 102. The service may be provided by device management engine 128 of the wireless carrier network 102. The device management engine 128 may store the user device information in a device information database 130. In some embodiments, the device management engine 128 may supplement the user device information with additional information from one or more internal databases and/or one or more external databases. For example, internal databases may include a customer database that contains information on the payment history, device upgrade history, and/or credit rating of the customer 120 that is associated with the user device. External databases may include a manufacturer database that holds additional information such as the device first use date, device warranty status, operating system version, and/or product recall information for user devices.

At block 506, the diagnostic device 104 may receive a unique code that is generated by the service provided by the device management engine 128 of the wireless carrier network 102. The unique code may be associated with the user device information of the user device. In various embodiments, the unique code may be an alphanumeric code or a machine-readable code. For example, the alphanumeric code may be a 3-character string that is designed for easy viewing and data entry. The machine-readable image may be a two-dimensional code, such as barcode, a QR® code, an Aztec code, a MaxiCode, or another code that is not readily decipherable to a human user.

At block 508, the diagnostic device 104 may present the unique code on a display on the diagnostic device 104. Accordingly, the unique code in alphanumeric form may be viewed by a customer service representative 122 for the purpose of entry into the information retrieval application 136 on the secure terminal 106. Alternatively, the unique code in machine-readable code form may be entered into the information retrieval application 136 via a code scanner and code recognition software. In alternative embodiments, the unique code may be entered in the information retrieval application 136 via other means, such as by connecting the diagnostic device 104 to the secure terminal 106 via a wired or wireless communication connection so that the information retrieval application 136 may retrieve the unique code from the diagnostic device 104.

At block 510, the diagnostic device 104 may present one or more user device configuration options. In at least one embodiment, the user device configuration options may be presented on a touch screen display of the diagnostic device 104, and a user may select one of the configuration option via the touch screen display. However, other user input interfaces may be used to make a selection. The device configuration options may include options for pushing updates to a user device, running device health diagnostics for the user device, performing a content backup for the user device, resetting the user device to a default factory setting, and/or so forth.

At decision block 512, the diagnostic device 104 may determine whether a user device configuration option is selected. Accordingly, if a user device configuration option is selected ("yes" at decision block 512), the process 500 may proceed to block 514. At block 514, the diagnostic device 104 may initiate a configuration of the user device based on the selected user device configuration option. For example, the diagnostic device 104 may push an update to a user device, run device health diagnostics for the user device, perform a content backup for the user device, or reset the user device to a default factory setting. However, if no user device configuration option is selected ("no" at decision block 512), the process 500 may loop back to the block 510, so that the one or more user device configuration options are displayed.

FIG. 6 is a flow diagram of an example process 600 for device management services of a wireless carrier network to generate a unique code and use the unique code to present user device information to a user device. At block 602, the device management engine 128 on a secure server 116 may receive user device information of a user device. In various embodiments, the user device may use the telecommunication services provided by the wireless carrier network. The user device information may include information that is received from a diagnostic device, such as the diagnostic device 104. In such instances, the diagnostic device may send the user device information to the device management engine 128 via the peripheral server 114. Alternatively or concurrently, the user device information may include information regarding a user device that is obtained from one or more internal databases or one or more external databases. For example, the user device information concerning the user device may be alternatively obtained from the equipment information database 322 of the wireless carrier network 102 in response to a USSD message code that is sent by the user device.

At block 604, the device management engine 128 may store the use device information in a device information database, such as the device information database 130. In various embodiments, the user device information may include device identification information, device configuration information, information regarding a customer that owns the user device, and/or so forth. For example, the device configuration information may include an indication of whether the operating system of the user device is modified (e.g., rooted, hacked, etc.), a list of software applications that are installed on the user device, an indication of whether specific services (e.g., a device location service, a cloud storage service, etc.) are active on the user device, and/or other relevant information.

At block 606, the device management engine 128 may generate a unique code that corresponds to the user device information of the user device. In various embodiments, the unique code may be used to identify and retrieve the user device information from the device information database 130. For example, the unique code may be associated with a user device identifier included in the user device information, in which the user device identifier is a primary key for looking up the user device information.

At block 608, the device management engine 128 may provide the unique code to the diagnostic device for presentation by the diagnostic device 104 or a display of the user device 112. In some embodiments, the device management engine 128 may send the unique code to the diagnostic device 104 via the peripheral server 114. In other embodiments, the device management engine 128 may send the unique code to the user device 104 in a USSD reply message. The unique code may be configured to expire after a predetermined time period, so that the unique code may be used to retrieve the corresponding user device information within the predetermined time period. The unique code may be in alphanumeric text form or machine-readable code form.

At block 610, the device management engine 128 may receive the unique code from an information retrieval application, such as the information retrieval application 136. In various embodiments, the information retrieval application may reside on a secure terminal that communicates with the secure server 116 via an internal network 138. The unique code in alphanumeric form may be manually entered into the information retrieval application via a user input interface (e.g., physical keyboard, touch screen, etc.). In some alternative scenarios, the unique code in machine-readable code form may be entered into the information retrieval application via a code scanner and code recognition software. In other alternative scenarios, the information retrieval application may directly retrieve the unique code from the diagnostic device via a wired or wireless communication connection.

At decision block 612, the device management engine 128 may determine whether the unique code is valid. In various embodiments, the unique code may be valid if the unique code has not expired for the purpose of retrieving the user device information from the device information database 130. Thus, if the unique code is valid ("yes" at decision block 614), the process 600 may proceed to block 616.

At block 616, the device management engine 128 may retrieve the user device information of the user device from the device information database 130 using the unique code. For example, the device management engine 128 may look up the primary key of the user device information of the user device based on the unique code, and the user device information is then further retrieved.

At block 618, the device management engine 128 determine an eligibility status of the user device based on the user device information. The eligibility status may indicate whether the user device is eligible for the return, the exchange, or the upgrade of the user device. In various embodiments, the device management engine 128 may use machine logic to generate an eligibility status based on multiple variables. For example, the device management engine 128 may determine that a user device is ineligible if the user device information indicates that the operating system of the user device has been modified. In another example, the device management engine 128 may determine that a user device is ineligible if the user device information indicates that unauthorized software application are installed or active on the user device.

At block 620, the device management engine 128 may send the user device information and the eligibility status to the information retrieval application 136 on the secure terminal 106. In instances in which the eligibility status indicates that the user device is ineligible, the eligibility status information may include suggestions of software configuration modifications to the user device that may make the device eligible for the device return, the device exchange, or the device upgrade.

Returning to decision block 614, if the device management engine 128 determines that unique code is valid ("no" at decision block 614), the process 600 may proceed to block 622. At block 622, the device management engine 128 may send an error message to the information retrieval application on the secure terminal. The error message may indicate that the unique code is invalid or expired.

The use of the diagnostic device may enable customer service representatives to retrieve the device configuration information and the eligibility status of a user device without searching for the device identification information of the user device. As device identification information of the user device may be difficult at times to locate without knowing the specific software configuration of the user device, the techniques may enable the customer service representative provide assistance to customers in a more expedient manner. Further, the diagnostic device may provide the customer service representative with the ability to perform additional services for the user device. Thus, the techniques may reduce customer service support cost and time, as well as increase customer satisfaction and customer retention.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A diagnostic device, comprising:
a wired or wireless communication interface;
one or more processors; and
memory having instructions stored therein, the instructions, when executed by the one or more processors, perform actions comprising:
prompting an input of an authentication credential into the diagnostic device in response to a user device connecting to the diagnostic device via the wired or wireless communication interface;
receiving user device information of the user device that is connected to the diagnostic device via the wired or wireless communication interface, the user device information being received in response to an interrogation of the user device performed by the diagnostic device, in which the interrogation is performed following the authentication credential inputted at the diagnostic device matching an authorized authentication credential, wherein the user device information includes an indication of whether one or more specific services are active on the user device;
sending, from the diagnostic device, the user device information of the user device to a server associated with a wireless carrier network, the user device information being used by the server associated with the wireless carrier network to determine an eligibility status of the user device for a device return, a device exchange, or a device upgrade; and
receiving a unique code generated by the wireless carrier network that is associated with the user device information of the user device, the unique code for obtaining the user device information that includes the indication of whether one or more specific services are active on the user device and the eligibility status from the server associated with the wireless carrier network.

2. The diagnostic device of claim 1, wherein the actions further comprise presenting the unique code on a display of the diagnostic device.

3. The diagnostic device of claim 1, wherein the actions further comprise:
presenting at least one of a plurality of user device configuration options, the plurality of user device configuration options including pushing an update to the user device, running device health diagnostics for the user device, performing a content backup for the user device, or resetting the user device to a default factory setting; and
initiating a configuration of the user device based on a selected user device configuration option of the plurality of user device configuration options.

4. The diagnostic device of claim 3, wherein the initiating includes initiating the configuration of the user device following a selection of a corresponding user device configuration option via a touch screen display.

5. The diagnostic device of claim 1, wherein the actions further comprise:
performing an automatic shutdown of the diagnostic device in response to the diagnostic device being connected an internal network instead of a peripheral network of the wireless carrier network;
wiping at least partially of the memory of the diagnostic device in response to a determination from a geolocation sensor of the diagnostic device that the geolocation of the diagnostic device is outside of a predetermined distance from an assigned geolocation stored in the memory of the diagnostic device; or
performing the automatic shutdown or the wiping at least partially of the memory in response to a command from the server associated with the wireless carrier network.

6. The diagnostic device of claim 5, wherein the command is issued by the server associated with the wireless carrier network in response to the server determining that the diagnostic device is connected to the internal network instead of the peripheral network or that the geolocation of the diagnostic device is outside of a predetermined distance from a particular geolocation.

7. The diagnostic device of claim 1, wherein the user device information further includes device identification information that identifies the user device and user configuration information, the user configuration information includes an indication of whether an operating system of the user device is modified, or a list of one or more software applications that are installed on the user device.

8. The diagnostic device of claim 1, wherein the unique code is configured to become invalid for retrieving the user device information from the server associated with the wireless carrier network after a predetermined time period.

9. The diagnostic device of claim 1, further comprising a physical case that includes a tie down feature for securing the diagnostic device to another object.

10. One or more non-transitory computer-readable media storing computer-executable instructions that upon execution cause one or more processors to perform acts comprising:
generating a unique code that corresponds to user device information of a user device that is stored in a device information database of a wireless carrier network;
transmitting the unique code to the user device or to a diagnostic device that obtained the user device information from the user device via a wired or wireless communication interface;
retrieving the user device information of the user device from the device information database, the unique code being inputted into an information retrieval application on a secure terminal following transmission of the unique code to the diagnostic device;
determining an eligibility status of the user device for a device return, a device exchange, or a device upgrade based at least on the user device information of the user device as retrieved from the device information database; and
sending a command that causes the diagnostic device to perform a shutdown or wipe at least partially a memory of the diagnostic device in response to determining that a geolocation of the diagnostic device is outside of a predetermined distance from a particular geolocation.

11. The one or more non-transitory computer-readable media of claim 10, wherein the acts further comprise sending the user device information and the eligibility status of the user device to the information retrieval application at the secure terminal.

12. The one or more non-transitory computer-readable media of claim 10, wherein the unique code is inputted into the information retrieval application on the secure terminal via a user input interface, a code scanner, or a communication connection.

13. The one or more non-transitory computer-readable media of claim 10, wherein the unique code is to expire after a predetermine time period, and wherein the retrieving includes retrieving the user device information from the device information database and the determining includes determining an eligibility status of the user device in response to the unique code being unexpired.

14. The one or more non-transitory computer-readable media of claim 13, wherein the acts further comprise sending an indication that the unique code is invalid in response to the unique code being expired.

15. The one or more non-transitory computer-readable media of claim 10, wherein the acts further comprise supplementing the user device information stored in the device information database with supplemental information from one or more additional databases, the one or more additional databases including at least one of an internal wireless carrier network database or an external manufacturer database.

16. The one or more non-transitory computer-readable media of claim 10, wherein the retrieving the user device information includes retrieving an indication of whether an operating system of the user device is modified.

17. The one or more non-transitory computer-readable media of claim 10, wherein the generating includes generating the unique code at a secure server of the wireless carrier network, and wherein the diagnostic device is connected to the secure server at least through a peripheral network, and the secure terminal is connected to the secure server through an internal network that is more secure than the peripheral network.

18. The one or more non-transitory computer-readable media of claim 17, wherein the acts further comprise sending a command that causes the diagnostic device to perform a shutdown in response to determining that the diagnostic device is connected to the internal network.

19. The one or more non-transitory computer-readable media of claim 10, wherein the unique code is an alphanumeric code that is inputted into the information retrieval application via a user input interface or a machine-readable code that is inputted into the information retrieval application via a code scanner.

20. A computer-implemented method, comprising:

sending an inputted feature access code and a user identifier of a user to a server of a wireless carrier network, the server to retrieve a user device identifier of a user device that is associated with the user identifier from an equipment register of the wireless carrier network and translate the feature access code into an information query command for the user device identifier;

storing user device information of the user device, as received from an equipment information database, in a device information database of the wireless carrier network following the server sending the information query command and the user device identifier to the equipment information database;

generating a unique code that corresponds to the user device information of the user device that is stored in the device information database of a wireless carrier network;

transmitting the unique code to the user device or to a diagnostic device that obtained the user device information from the user device via a wired or wireless communication interface;

receiving the unique code from a secure terminal of the wireless carrier network, the unique code being inputted into an information retrieval application on the secure terminal via a user input interface or a code scanner;

retrieving the user device information of the user device from the device information database based at least on the unique code;

determining that the user device is ineligible for a device return, a device exchange, or a device upgrade based at least on the retrieved user device information of the user device; and sending the user device information and one or more suggested software configuration modifications to the software for making the user device eligible for the device return, the device exchange, or the device upgrade to the information retrieval application at the secure terminal.

21. The computer-implemented method of claim 20, wherein the feature access code is an Unstructured Supplementary Service Data (USSD) message.

22. The computer-implemented method of claim 20, wherein the specific feature access code is inputted at the user device.

* * * * *